March 23, 1926.
T. H. HALE
DIRECTION INDICATOR
Filed March 2, 1925
1,577,713
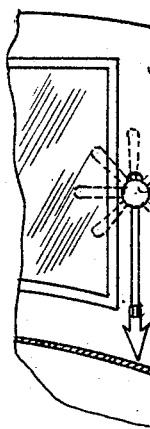
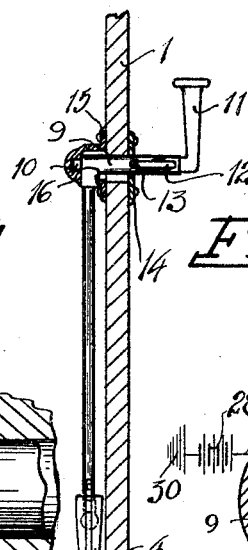
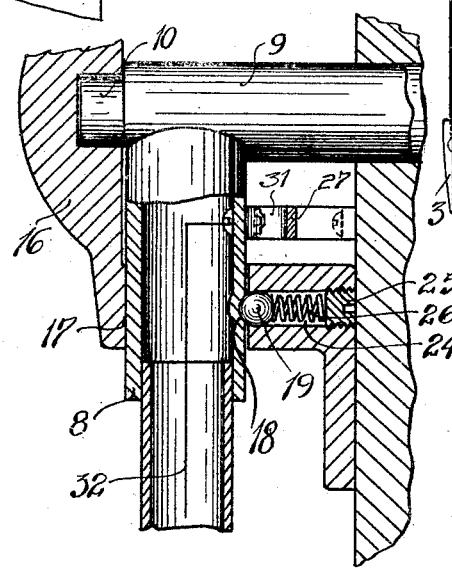
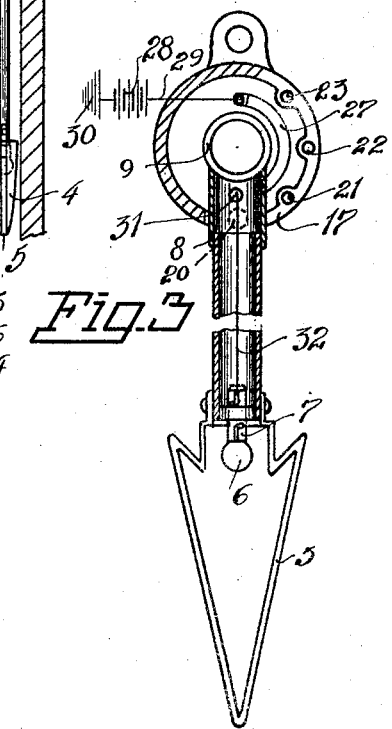
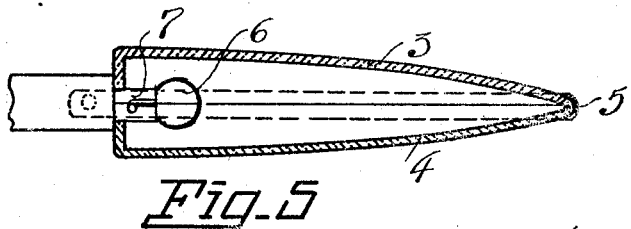
Inventor
Thomas H. Hale
By Herbert E. Smith
Attorney Patented Mar. 23, 1926.

1,577,713

UNITED STATES PATENT OFFICE.

THOMAS H. HALE, OF SPOKANE, WASHINGTON.

DIRECTION INDICATOR.

Application filed March 2, 1925. Serial No. 12,541.

*To all whom it may concern:*

Be it known that I, THOMAS H. HALE, a citizen of the United States, residing at Spokane, in Spokane County and State of Washington, have invented certain new and useful Improvements in Direction Indicators, of which the following is a specification.

My present invention relates to improvements in direction indicators for automotive vehicles, and is particularly adapted for use on closed cars. The device of my invention is pivotally supported at the exterior of the car body to swing laterally therefrom for signalling and is operated from the interior of the car, manually. The indicator is equipped with a normally open electric lighting circuit which is automatically closed when the signal arm or indicator is swung to any one of its operative positions to illuminate the displayed indicator.

Means are provided for retaining the signal arm in a selected one of three display positions for indicating different directions of turn or stop.

The invention consists in certain novel combinations and arrangements of parts as will hereinafter be more specifically set forth and claimed.

In the accompanying drawings I have illustrated one complete example of the physical embodiment of my invention wherein the parts are combined and arranged according to the best mode I have thus far devised for the practical application of the principles of my invention.

Figure 1 is a perspective view of the traffic indicator showing its relation to the car with the indicator in full lines in normal position and indicating by dotted lines the three selected display positions.

Figure 2 is an enlarged view of the indicator with some parts of the mounting in section together with a part of the car frame.

Figure 3 is an enlarged sectional view of the device partly broken away for convenience of illustration.

Figure 4 is an enlarged detail sectional view of part of the mounting showing also a part of the pivotal bearing of the indicator and the means for retaining the indicator in selected position.

Figure 5 is a vertical sectional view in detail of the arrow tip or pointer at the end of the signal arm, which arrow is preferably made of glass and adapted to be illumined from the interior.

The indicator comprises an arm pivoted at a suitable location on part of the automobile body, as at the left side and front portion thereof, as in the frame 1 in Figures 1 and 2, to swing laterally to any one of the three positions indicated in Figure 1 by dotted lines as R for a right turn, L for a left turn, and S for a signal that the driver is about to stop his car.

The indicator comprises a tubular arm 2 of suitable material as an iron pipe of proper size and length for the purpose, and this hollow arm has affixed at its free end an arrow shaped, glass pointer preferably made up of two sections 3 and 4 which are clamped together by means of a metallic or other binding strip 5 to form a rigid and tightly closed structure. This hollow glass pointer may be semi-opaque or of ground glass, and if desired may be colored glass.

Within the pointer is encased an electric lamp bulb 6 having its socket 7 in the outer end of the signal arm. If desired the lamp may be colored, as with a red color, instead of coloring the glass arrow or pointer.

At its upper end the signal arm has attached thereto an angular or L-shaped member comprising an attaching sleeve 8 and a horizontal bearing sleeve or hollow rock shaft 9 which at its outer end is fashioned with an axially alined, reduced bearing lug or journal 10.

The bearing sleeve or hollow rock shaft extends laterally through an opening in the car body frame, the attaching sleeve 8 being located outside the frame member and the opposite end of the hollow rock shaft being located within the enclosure of the car body, preferably. At its inner end the hollow rock shaft is equipped with a crank handle 11 which is inserted within the rock shaft and turns therewith. The shank of the crank handle is adjustable longitudinally in the rock shaft to accommodate the length of the pivotal parts to the thickness of the frame, as well as for the convenience of the driver of the car, and for this purpose the rock shaft is slotted as at 12, said slot extending longitudinally of the hollow shaft. The shank of the crank handle has a transversely extending pin 13 therein which projects into the slot and causes the rock shaft to turn with the crank handle, while at the same time permitting the crank handle to be adjusted longitudinally with relation to the hollow rock shaft.

The rock shaft is mounted to turn in the inner bearing plate 14 which is affixed at the inner side of the frame 1, and a complementary outer bearing plate 15 for the shaft is fashioned with a circular housing 16 at the outer side of the frame. As seen in Figure 4 the bearing lug or journal 10 of the rock shaft is supported in the housing to form a stable mounting for the rock shaft.

The housing is provided with an arcuate slot 17 of ample length to permit swinging movement of the sleeve 8 of the signal arm therein, and it will be obvious that by turning the crank handle 11 the signal arm may be swung to selected position for displaying the proper signal.

To retain the signal arm in the selected position I employ a resilient or spring actuated detent for co-action between the arm or its sleeve 8 and the housing wall. For this purpose the sleeve 8 is fashioned with a depression 18 that co-acts with any one of four spring pressed balls or detents 19 located at the four points 20, 21, 22 and 23 in Figure 3, of the housing or wall adjacent the slot 17.

The ball or resilient detent is retained in a socket 24 (Figure 4) having a plug 25 to close one end thereof in the housing wall. The ball is retained in the other end of the socket but is urged therefrom by a spring 26 into contact with the depression of the sleeve 8. When the arm is swung the sleeve first presses the ball outwardly therefrom but the spring then forces the ball into the depression to retain the arm if further pressure is not applied to the arm. The friction of the detent is sufficient to retain the arm, but this frictional engagement may readily be overcome by pressure on the crank arm to swing the signal arm past the detents to the desired and selected position.

The lamp 6 is illumined in the pointer when the signal arm is swung to a selected position other than the normal position. For this purpose a normally open lighting circuit is provided and an arcuate conductor plate 27 is affixed in the housing. This plate is connected to a battery 28 by the wire 29 of the lighting circuit and grounded at 30 in usual manner. An electric contact point 31 is carried by the sleeve 8 which is adapted to swing into contact with the conductor plate before the arm reaches the first display point for the signal, and this contact point by frictional and electrical connection with the arcuate plate closes the normally open lighting circuit during contact of the two parts of the circuit maker. A wire 32 leads from the conductor plate through the hollow signal arm to the lamp for completing the circuit and the usual control switch is provided in the circuit for breaking the circuit when the lamp is not needed, as during daylight.

Various changes and alterations may be made, as for instance in the resilient retaining or detaining means for the signal arm, within the scope of my claims without departing from the spirit of my invention, and such changes are contemplated.

Having thus fully described my invention what I claim as new and desire to secure by Letters Patent is—

1. A direction indicator comprising a support, a housing secured thereto, a rock shaft journaled through said support and having a bearing in a part of said housing, an extension formed laterally on said rock shaft, a semaphore arm mounted in said extension, an operating handle connected to said rock shaft at one side of said support, means for adjusting said operating handle longitudinally of said rock shaft, and a spring detent carried by said support for engaging said rock shaft extension to retain the semaphore arm in any of a plurality of positions.

2. The combination in a direction indicator, of a housing, a hollow longitudinally slotted rock shaft journaled therein, a semaphore arm carried by said shaft, a crank handle seated in said hollow rock shaft, a pin on said handle for coaction with the slotted shaft, and coacting means on said arm and housing for retaining said arm in selected position.

In testimony whereof I affix my signature.

THOMAS H. HALE.